United States Patent
Hecht

(10) Patent No.: US 9,108,459 B2
(45) Date of Patent: Aug. 18, 2015

(54) SYSTEM AND METHOD FOR ADVERTISING

(71) Applicant: Eric Hecht, Beverly Hills, CA (US)

(72) Inventor: Eric Hecht, Beverly Hills, CA (US)

(*) Notice: Subject to any disclaimer, the term of this patent is extended or adjusted under 35 U.S.C. 154(b) by 100 days.

(21) Appl. No.: 14/146,286

(22) Filed: Jan. 2, 2014

(65) Prior Publication Data
US 2015/0183263 A1    Jul. 2, 2015

(51) Int. Cl.
*B41F 17/00*    (2006.01)
*B44B 5/00*    (2006.01)
*B41F 27/00*    (2006.01)

(52) U.S. Cl.
CPC .............. *B44B 5/0004* (2013.01); *B41F 17/00* (2013.01); *B41F 27/00* (2013.01); *B44B 5/0047* (2013.01)

(58) Field of Classification Search
CPC ..... B44B 5/0004; B44B 5/0047; B41F 17/00; B41F 27/00
See application file for complete search history.

(56) References Cited

U.S. PATENT DOCUMENTS

| | | | |
|---|---|---|---|
| 1,093,310 A | | 4/1914 | Carkhuff |
| 1,571,248 A | | 2/1926 | Eickhoff |
| 4,050,167 A | * | 9/1977 | Senter ........................... 36/32 R |
| 4,050,168 A | * | 9/1977 | Pace ............................... 36/136 |
| 4,958,446 A | | 9/1990 | Brown |
| 5,331,753 A | * | 7/1994 | Rodibaugh ..................... 36/136 |
| 5,896,929 A | | 4/1999 | Dori |
| 6,497,056 B1 | * | 12/2002 | McGoveran ........................ 36/1 |
| 6,776,088 B2 | | 8/2004 | Halt et al. |
| 7,080,955 B2 | * | 7/2006 | Gregg ............................. 404/89 |
| 7,140,804 B2 | * | 11/2006 | Gregg ............................. 404/93 |
| 2002/0195006 A1 | | 12/2002 | Halt |

FOREIGN PATENT DOCUMENTS

| | | |
|---|---|---|
| DE | 2711034 A1 | 9/1978 |
| WO | 2009034183 A1 | 3/2009 |

* cited by examiner

*Primary Examiner* — David Banh
(74) *Attorney, Agent, or Firm* — Fulwider Patton LLP

(57) ABSTRACT

A system for advertising on a surface capable of receiving impressions made by a wheel, the system comprising a set of chains configured to be removably attached to a wheel; at least one plate bearing an embossment, on an outer surface thereof, of a mark in negative image; wherein the plate is attached to the chains and positioned to leave a positive image of the mark on the surface when the wheel rotates upon the surface.

15 Claims, 3 Drawing Sheets

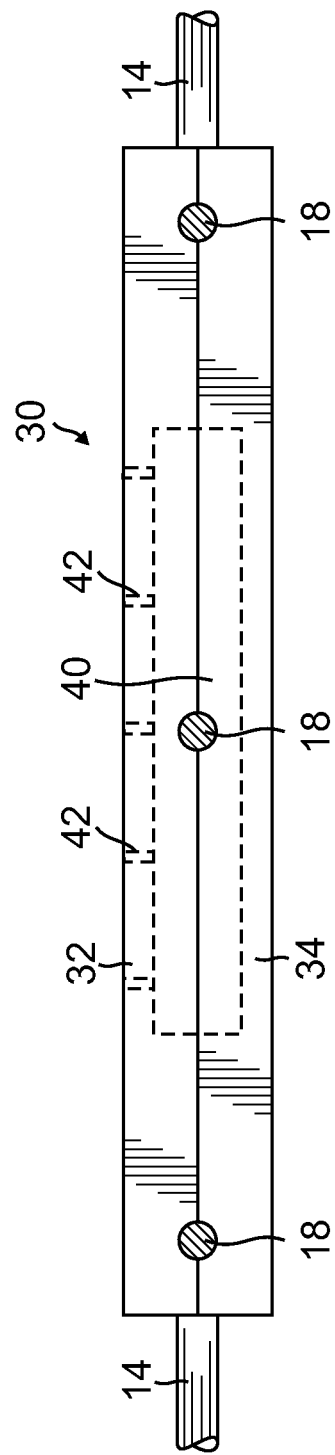

SYSTEM AND METHOD FOR ADVERTISING

BACKGROUND

The present invention relates to systems and methods for making imprints in sand, snow, mud, or other impressionable surfaces. More specifically, the invention relates to systems and methods for making commercial advertising imprints by a vehicle.

It has been noted in the prior art that imprints left in sand, snow, or road surface by vehicle wheels may be used to advertise commercial goods. For example, U.S. Pat. No. 1,571,248 teaches that a wheel may be custom molded to include words or marks in minor image (i.e., negative image) such as "Coca Cola" or other trademarks or forms of communication with a reader (collectively referred to herein as a "mark"). Then, upon mounting the wheel upon a vehicle, movement of the vehicle on sand or snow or other similar impressionable surfaces will leave positive image impressions of the mark on that surface. This action has the useful effect of temporary advertisement or communication with members of the public who may walk along the same road, beach, or ski slope and who will inevitably see the marks before they are eroded by the elements.

It has become increasingly understood in recent years that, to be effective, advertising should be targeted at a select audience of consumers who are most likely to purchase the goods on offer. One example of such advertising may be witnessed at a beach, where light aircraft are used to pull pendants behind the aircraft bearing advertising targeted at the throng below on the beach, for goods and services such as alcohol, local accommodation, restaurants, and the like. Under ordinary circumstances, it would be useful to combine such airborne advertising with imprints in the sand made by vehicle wheels, more especially of the trucks and utility vehicles used by lifeguard and police vehicles which are legally permitted to drive on the beach at the same time as bathers are gathered on the beach. Such combination targeted advertising in these circumstances is considered to be highly effective.

However, drawbacks exist with the present type of system for leaving temporary marks upon a surface, in the manner described above, namely formed by a minor image of the mark molded into a wheel tread. First, if one wishes to change the mark, it is difficult to do so with ease in a short period of time: One is compelled to remove from the vehicle the wheel bearing one mark (in negative), and substitute it with another wheel bearing a different mark (in negative). This may require returning the vehicle to a garage, and cannot easily be done in the field. Second, another disadvantage is that molding a custom designed impression into a wheel is very expensive. A dedicated wheel mold must be constructed, and rubber or polymer must be poured into the mold to produce a wheel with a tread having a desired imprint, in negative, of a mark. Such operations cannot benefit from the economies of scale that mass produced wheels enjoy, resulting in a very expensive product. Having a plurality of different advertising marks would be even more expensive. Third, a wheel with a desired custom imprinted mark may have to be driven a long distance from a storage garage to the beach or other location where trademarks are required to be imprinted onto an impressionable surface. This gives rise to two separate additional problems. First, a custom made wheel with custom designed advertising imprints will not enjoy the same roadworthiness that a commercially produced wheel enjoys in terms of its ability to gain traction on a wet or slippery surface. Indeed, in many states it may be illegal to modify a wheel to include such a modification. Second, the wheel will, as all wheels do, tend to wear down over a lengthy journey, and along with it, the imprint will wear down too. As already discussed above, the cost of replacing a custom made wheel with an imprint is much more expensive than a mass produced wheel, and so the cost of maintaining the imprint will be excessive. These problems with the existing system and method have suppressed targeted advertising on beaches and ski slopes because the cost, complexity, and inconvenience of the system is great.

Accordingly, there exists a need in the art for a system and method for cheaply and rapidly enabling a vehicle with a wheel imprint for advertising and similar purposes. The present invention addresses these and other needs.

SUMMARY OF THE INVENTION

In some embodiments, the invention is a system for advertising on a surface capable of receiving impressions made by a wheel. The system comprises a set of chains configured to be removably attached to a wheel. At least one plate is provided, the plate bearing an embossment, on an outer surface thereof, of a mark in negative image. The plate is attached to the chains and positioned to leave a positive image of the mark on the surface when the wheel rotates upon the surface. In some embodiments, the set of chains is a set of standard commercially available snow chains. In some other embodiments, the set of chains may include webbing. In yet other embodiments, the set of chains may include two circumferential chains and a plurality of cross chains configured to extend between the circumferential chains, and wherein at least one circumferential chain is formed from an elastically extensible material, which may be a polymer.

In some embodiments, the at least one plate is formed from two platelets that are attached to each other. In further embodiments, the two platelets are connected to each other by attachment means that allows the platelets to be unattached from each other. In yet further embodiments, the plate defines reservoirs which are connected to an upper surface of the plate via weep holes, the reservoir being filled with a colored fluid.

In yet other embodiments, the invention is a method for advertising on a surface capable of receiving impressions made by a wheel. The invention comprises providing a first set of chains configured to be removably attached to a wheel; attaching to the chains at least one first plate bearing an embossment, on an outer surface of the plate, of a first mark in negative image; attaching the set of chains to the wheel; rotating the wheel on a the surface; and leaving a series of positive impressions of the first mark on the surface. In some embodiments, the invention further includes removing the first set of chains from the wheel, and attaching a second set of chains bearing at least one second plate with an embossment of a second mark different from the first mark. In further embodiments the invention further includes removing the first set of chains from the wheel, removing from the first set of chains the at least one first plate, and attaching at least one second plate bearing a second mark different from the first mark. In some embodiments, the step of providing a first set of chains includes providing a set of commercially available snow chains. In some embodiments, providing a first set of chains includes providing a set of chains comprising two circumferential chains and a plurality of cross chains extending between the circumferential chains, wherein at least one circumferential chain is formed from an elastically extensible material and is connected into a full circle before attaching the set of chains to the wheel, and wherein attaching the set of chains to the wheel includes slipping the extensible circumferential chain over the wheel.

In some embodiments, the step of leaving a series of positive impressions of the first mark on the surface includes providing a reservoir in the at least one plate, introducing a colored fluid into the reservoir, and leaving a set of colored impressions on the surface.

These and other advantages will become apparent when read in conjunction with the drawings and the detailed description of the preferred embodiments.

BRIEF DESCRIPTION OF THE DRAWINGS

FIG. 3 is a view, in partial section, of a detail of the structure seen in FIG. 1.

DETAILED DESCRIPTION OF THE PREFERRED EMBODIMENTS

With reference to the drawings, an invention is described that is a system and method for supplying a wheel (preferably for a vehicle) with a negative imprint of an image that will form a mark when seen in positive image. It is contemplated that the invention may be used with any type of wheel, not limited to vehicular wheels, but may also include any type of device such as a regular car, a motorbike, push cart, wheelbarrow, or even a suitably modified shopping cart and the like. The system and method is configured to address problems in the prior art.

Figure 1:
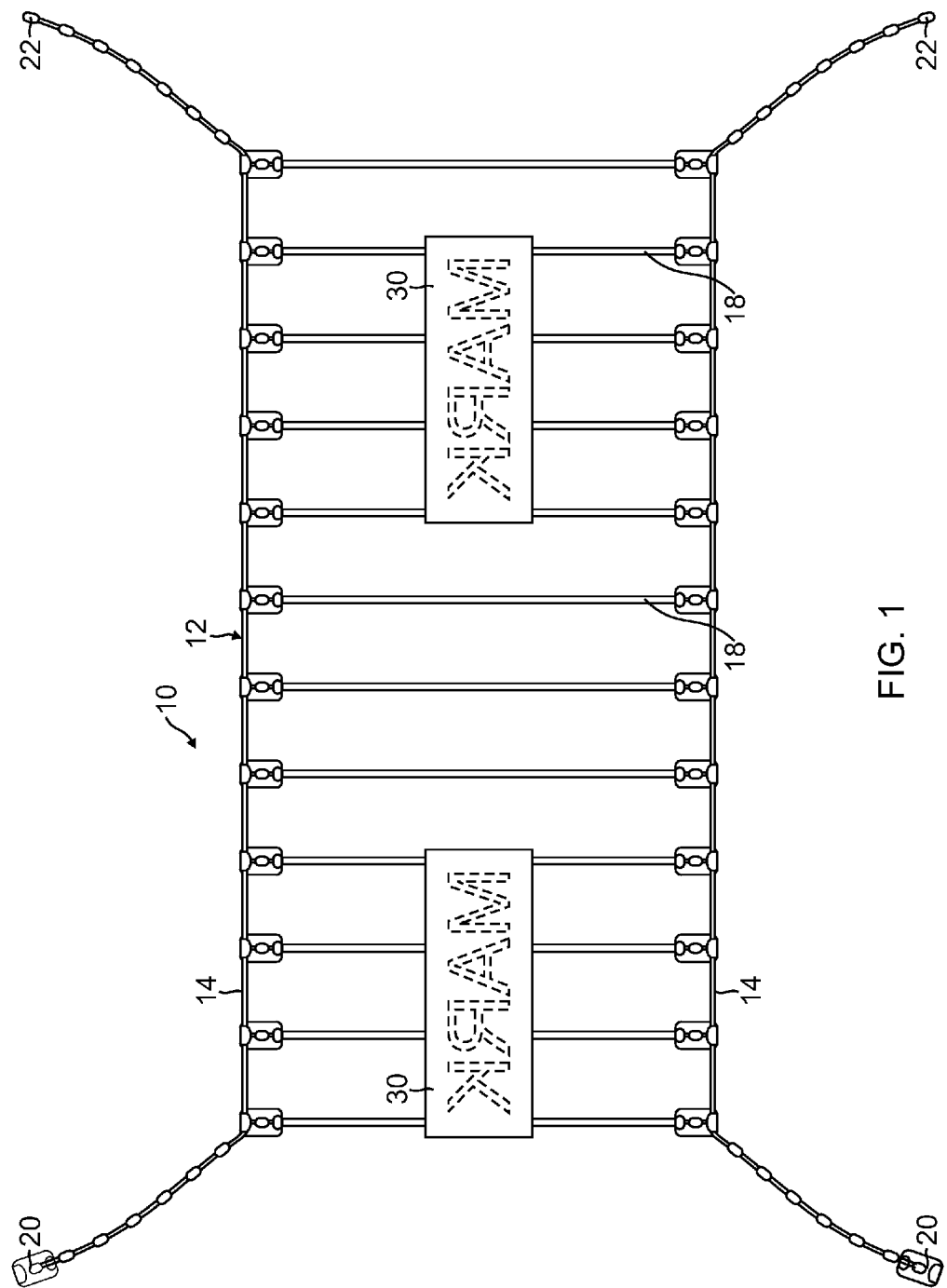
FIG. 1 is perspective view of a structure having features of the invention.

In one embodiment, and with reference to FIG. 1, a structure 10 is configured to provide a mark (in negative) that may be rapidly attachable and removable from a wheel, and to this end, a set of chains such as commercially available snow chains may be used, but the invention is not so limited.

FIG. 1 exemplifies a standard snow chain 12, suitable for a vehicle wheel, in an elongate planar condition prior to attachment to a wheel. However, wires, ropes, webbing, or rubber bands, and the like, are within the scope of the invention and the term "chain" shall be used herein to include such other structures as coextensive and interchangeable with the term "chain." Each circumferential chain extends parallel to the other, and is sized to extend once around a standard size wheel. As is known, a typical snow chain comprises a set of two circumferential chains 14. At the ends of each circumferential chain are mating detent clasps 20, 22, configured to be fixed to each other when the chain is placed around the wheel, in order to maintain the chain on the wheel. Extending between each circumferential chain 14, and attached thereto, is a plurality of cross chains 18 which are ordinarily configured to provide the snow chain with traction when it is used in snow. The cross chains 18 typically extend parallel to each other, and are perpendicular to the circumferential chains 14, so that a maximum amount of traction may be imparted to the wheel when the snow chain is used in its intended manner.

Figure 2:
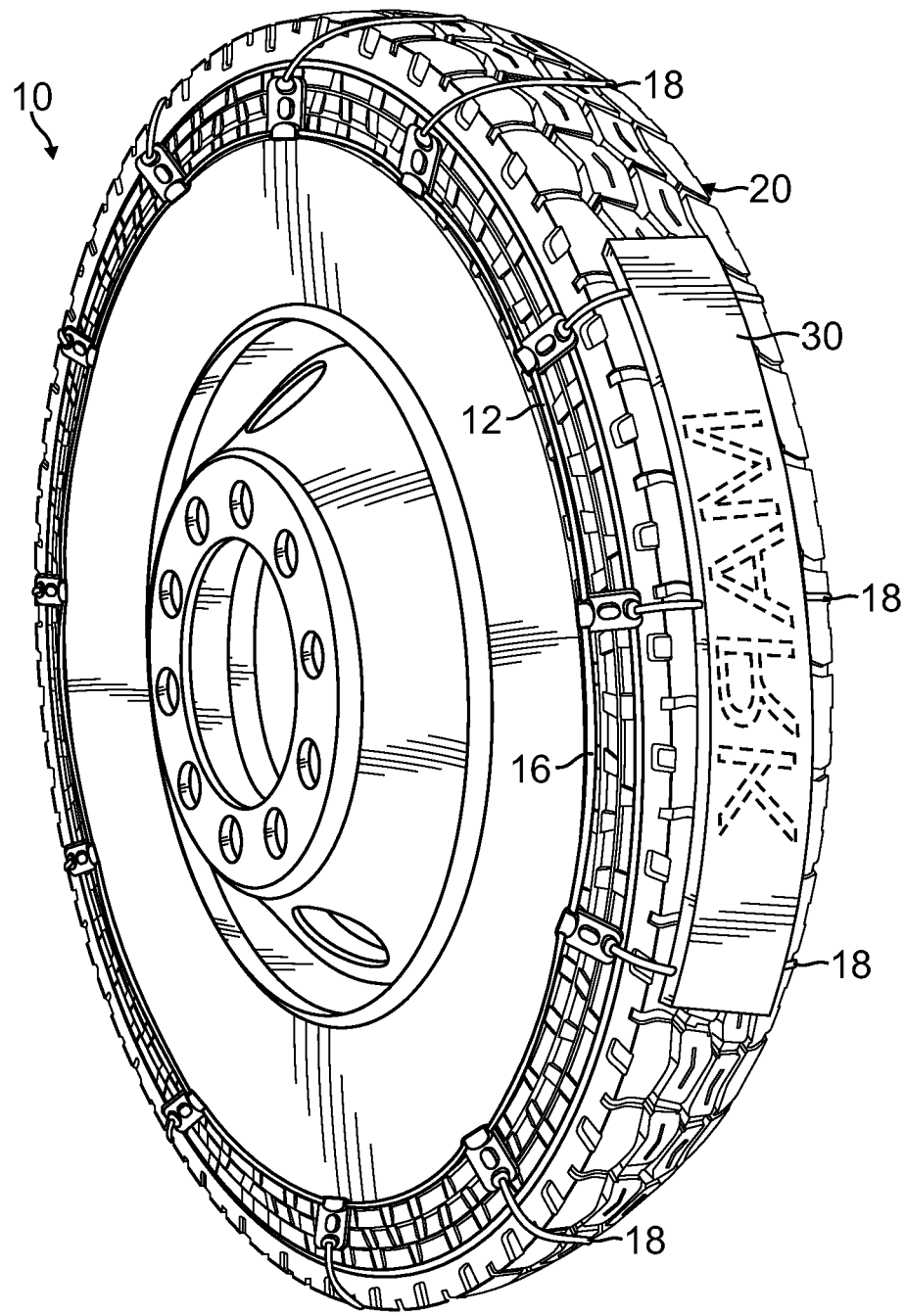
FIG. 2 is a perspective view of the structure of FIG. 1 mounted onto a vehicle wheel.

FIG. 2 exemplifies the structure 10 of an embodiment of the invention attached to a vehicle wheel.

Added to the chain 12 are features which provide the invention with its novel and useful properties. With reference to FIGS. 1 and 2, there is exemplified how at least one mirror image of a mark may be attached to the chain 12. In this regard, a rectangular plate 30 may be formed to carry the mirror image of the mark, and the plate may be attached to the snow chain by using at least one of the cross chains 18 to form a base for attachment.

As exemplified in FIG. 3, in some embodiments, the plate 30 may comprise two platelets, an upper platelet 32, and a lower platelet 34 which are configured to be joined or fused to each other and to capture portions of the cross chains 18 which are sandwiched between the platelets. Fusion of the platelets 32, 34 over the cross chains provides a strong support for the plate, and may be accomplished in a manner to suit the material from which the platelets are made. In some embodiments, the platelets are made of a rubber or polymer compound, or a plastic compound, and a known adhesive glue may be used to fuse the platelets together. If the platelets are made of wood, then glue or alternatively or additionally screws may be used to fuse the platelets together. If the platelets are made of metal, then clips or even spot welding may be used to fuse the platelets together. However, spot welding is of a more permanent nature, and it will be more difficult to separate the platelets in the event they require renewal or repair. In some embodiments, the platelets are attached to each other using a form of attachment that allows for easy separation, so that any damage to the platelets is easily repaired, and further, so that the platelets may be exchanged for different platelets bearing different marks. For example, side clips or recessed bolts with washers may be used to grip the two platelets to each other. In the event a user wishes to swap out the mark on a first set of platelets with another mark on a second set of platelets, he may do so rapidly and easily, without having to purchase a second set of chains. It will be appreciated that rubber or polymer has the advantage of being flexible, and will conform to the radius of the wheel when the chain is attached to the wheel. Rigid materials may be used, but may require to be pre-formed to have the radius of the wheel. Rigid materials may be used in instances where the mark is intricate, and requires a firm base for embossing the mark (in negative).

When as many plates 30 as are desired are affixed to the chain, the chain may be fixed to the rear wheel of a vehicle in known manner, such as exemplified in FIG. 2. (Front wheel attachment may lead to the mark being overridden by the rear wheel.) Two sets of chains may be provided, one for each of the rear wheels. In some embodiments, the images on the plates may be the same. In other embodiments, at least two sets of plates are affixed to one chain, and the image on each plate may be different. This allows for more complex advertising, in that one plate may ask a question, and the other plate may provide a response. For example, "Where is the best restaurant?" on one plate, and "It is at [response]" on the second plate. If a second chain is provided for the second rear wheel of the vehicle, then those plates may, in turn, be the same as or different from the plates on the first wheel.

In yet further embodiments, the platelets, where formed from rubber or flexible polymer, may be configured to include reservoirs 40 (seen in broken line outline in FIG. 3), into which colored fluid is injected. Small weep holes 42 (also seen in broken line) for allowing the fluid to slowly escape may be provided in the platelets to coincide with the mark (in negative) embossed on the upper platelet 32. It will be appreciated that this embodiment has the ability to allow the fluid to slowly weep out of the reservoirs and to leave colored imprints of the mark in snow surfaces, where the color will be immediately visible to members of the public. The color red is immediately eye-catching for this purpose.

In yet further embodiments, the chain set may include chain elements formed from a rubber or polymer compound which possesses a reasonable amount of flexibility. In some variants of this embodiment, the rubber chain may be prepared so that at least one of the circumferential chains 14 form continuous circles before being installed on a wheel. In this case, the completed structure 10 may be installed on the wheel from the side of the wheel, rather than by placing the chains in a planar configuration on the ground and driving a wheel over it, thereafter connecting the ends of the chain together. The flexibility of the at least one circumferential chain 14 permits an operator to slip the innermost chain over the wheel, then to move the vehicle forward by one half revolution and slip the balance of the innermost chain over the wheel by stretching the innermost chain. The same process may be carried out in reverse for removing the structure 10. It will be appreciated that for this method to work, only the innermost circumferential chain need have elastically extensive properties. The outermost chain may be rigid in some embodiments. Thus, fabricating at least one of the circumferential chains from an elastically extensible polymer such as rubber allows a much more rapid installation and removal procedure. While it will be appreciated that the resulting structure will be weaker than a chain made completely of steel, such as a commercially available set of snow chains, the specific requirements of the situation are less stringent than a steel snow chain suitable for road travel. In the present embodiment, the structure may be installed for use on a smooth and sandy beach, or gentle snow field. The maximum speed of the vehicle will be severely restricted by the circumstances, and a set of chains that include an elastically extensible compound will be acceptable for the purpose, while at the same time introducing an advantage for rapid installation and removal of a set of chains of the invention. In this case, the outermost circumferential chain and the cross chains 18 need not be formed to possess as much flexibility as the innermost circumferential chain, as they will not need to be stretched during installation.

Thus, the present invention provides a flexible and inexpensive solution to problems found in the art of targeted advertising for beach and snow settings, and the like. Companies or entities who wish to target a beach or skiing population with immediate and direct advertising may approach the beach lifeguards or ski security personnel and arrange for them to place an embodiment of the invention on the wheels of the vehicles they use to patrol up and down the beach or ski slope just before or during the time when the population is present. The advertising company may contract to pay the guards or security officers with a fee based on the number of miles travelled on the relevant surface. This arrangement will provide much needed revenue to life guards and ski security personnel, and yet the advertising is environmentally sensitive, leaving no permanent harmful effect, and not even consuming more gasoline than would otherwise have been used in the course of the duties conducted by the security personnel. This may be compared with the vast amount of gasoline that advertising companies are prepared to spend by procuring light aircraft to fly along a beach dragging a pendant bearing advertising for the benefit of beach goers.

Thus, the various embodiments of the invention provides an advantageous structure for in a flexible and inexpensive manner. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A system for advertising on a surface capable of receiving impressions made by a wheel, the system comprising:
a set of chains configured to be removably attached to a wheel; and
at least one plate bearing an embossment, on an outer surface thereof, of a mark in negative image;
wherein, the plate is attached to the chains and positioned to leave a positive image of the mark on the surface when the wheel rotates upon the surface; and
wherein the set of chains includes two circumferential chains and a plurality of cross chains configured to extend between the circumferential chains.

2. The system of claim 1, wherein the set of chains is a set of snow chains.

3. The system of claim 1, wherein at least one circumferential chain comprises an elastically extensible material.

4. The system of claim 3, wherein the elastically extensible material is a polymer.

5. The system of claim 1, wherein the chains comprise webbing.

6. The system of claim 1, wherein the at least one plate is formed from two platelets that are attached to each other.

7. The system of claim 3, wherein the two platelets are connected to each other by attachment means such that the platelets are capable of being unattached from each other.

8. The system of claim 1, wherein the plate defines a reservoir which is connected to an upper surface of the plate via weep holes, the reservoir configured for being filled with a colored fluid.

9. The system of claim 1, wherein at least one plate is formed from a polymer.

10. A method for advertising on a surface capable of receiving impressions made by a wheel, comprising:
providing a first set of chains configured to be removably attached to a wheel;
attaching to the chains at least one first plate bearing an embossment, on an outer surface of the plate, of a first mark in negative image;
attaching the set of chains to the wheel;
rotating the wheel on the surface; and
leaving a series of positive image impressions of the first mark on the surface;
wherein, providing a first set of chains includes providing a set of chains comprising two circumferential chains and a plurality of cross chains extending between the circumferential chains, wherein at least one circumferential chain comprises an elastically extensible material and is connected into a full circle before attaching the set of chains to the wheel, and wherein attaching the set of chains to the wheel includes slipping the at least one circumferential chain, in full circle configuration, over the wheel.

11. The method of claim 10, wherein providing a first set of chains includes providing a set of snow chains.

12. The method of claim 10, wherein providing a first set of chains includes providing a set of chains that include webbing.

13. The method of claim 10, further including removing the first set of chains from the wheel, and attaching a second set of chains bearing at least one second plate with an embossment of a second mark different from the first mark.

14. The method of claim 10, further including removing the first set of chains from the wheel, removing from the first set of chains the at least one first plate, and attaching at least one second plate bearing a second mark different from the first mark.

15. The method of claim 10, wherein leaving a series of positive impressions of the first mark on the surface includes providing a reservoir in the at least one plate, introducing a colored fluid into the reservoir, and leaving a set of colored impressions on the surface.

\* \* \* \* \*